United States Patent

Weber et al.

[11] Patent Number: 5,456,797
[45] Date of Patent: Oct. 10, 1995

[54] METHOD OF PLANARIZING TRENCH STRUCTURES

[75] Inventors: Lothar Weber, Stuttgart; Monika Lorkowski; Klaus-Michael Mayer, both of Gerlingen, all of Germany

[73] Assignee: Robert Bosch GmbH, Stuttgart, Germany

[21] Appl. No.: 181,421

[22] Filed: Jan. 14, 1994

[30] Foreign Application Priority Data

Jan. 14, 1993 [DE] Germany ............................ 43 00 765.1

[51] Int. Cl.⁶ ............................ H01L 21/306; B44C 1/22; B29C 37/00
[52] U.S. Cl. .................... 437/67; 156/655.1; 156/662.1; 156/648.1; 437/228
[58] Field of Search ........................ 156/643, 645, 156/647, 654, 659.1, 662, 648, 655, 668; 437/67, 228

[56] References Cited

U.S. PATENT DOCUMENTS

| 3,313,013 | 4/1967 | Last | 437/67 |
| 4,568,601 | 2/1986 | Araps et al. | 428/167 |
| 4,654,120 | 3/1987 | Dougherty | 156/651 |
| 4,656,050 | 4/1987 | Araps et al. | 437/67 X |
| 5,217,568 | 6/1993 | Tessier | 156/647 X |
| 5,271,801 | 12/1993 | Valette | 156/647 X |

FOREIGN PATENT DOCUMENTS

| 0143963 | 6/1985 | European Pat. Off. . |
| 0199965 | 12/1986 | European Pat. Off. . |
| 2027991A | 2/1990 | United Kingdom . |

OTHER PUBLICATIONS

Booth, Bruce L. Low Loss Channel Waveguides in Polymers, *Journal of Lightwave Technology*, vol. 7, No. 10, Oct. 1989, New York, US, pp. 1445–1453.

Primary Examiner—William Powell
Attorney, Agent, or Firm—Spencer, Frank & Schneider

[57] ABSTRACT

A method of planarizing trench-like structures, particularly on semiconductor substrates, by filling in the trench-like structures. For this purpose, a pre-polymer is selectively filled into the trench-like structures, is hardened and is then expanded.

20 Claims, 2 Drawing Sheets

METHOD OF PLANARIZING TRENCH STRUCTURES

CROSS REFERENCE TO RELATED APPLICATION

This application claims the priority of application Ser. No. P 43 00 765.1-51, filed Jan. 14th, 1993, in the Federal Republic of Germany, the subject matter of which is incorporated herein by reference.

BACKGROUND OF THE INVENTION

The present invention relates to a method of planarizing trench-like structures, particularly those on semiconductor substrates, by filling in the trench-like structures.

In the manufacture of optical polymer components it is known to provide preferably V-shaped trench-like structures on semiconductor substrates or other components including integrated optical waveguides so as to permit the later coupling of optical fibers placed into the V-shaped structures in the correct position to light waveguides provided on the optical element. For this purpose, the V-shaped positioning trenches are etched in anisotropically in a known manner. An optimum coupling location between the optical fibers and the light waveguides is produced by filling the V-shaped positioning trenches and subsequently opening them again by excimer laser ablation in such a way that a surface is created which extends perpendicularly to the axial direction of the structures and forms an abutment.

Particularly in the case of polymer light waveguides, it is possible to perform a joint lazer ablation of waveguide end face and fiber guide structure.

To ensure the optimum coupling between fiber and chip, it is absolutely necessary to planarize the created trench-like microstructures. Since the semiconductor substrates equipped with the recessed structures must be coated with photolacquers or other thin films in order to be processed further lithographically, it is generally possible to apply a planar coating only by first filling the trench-like structures so they become flush with the substrate surface.

It is known, for example, if recesses in a range of up to about 10 µm are involved, to repeatedly coat the substrate surface and back etch an applied polyimide film in an oxygen plasma. With every new polyimide coating, the deviation from the desired planar surface remaining after the preceding process step is reduced a little. Depending on the depth and shape of the structures, this requires several repeated cycles with relatively high processing expenditures. Moreover, it is a drawback that, for example, in connection with the mentioned V-shaped optical fiber guide structures, structure depths of about 100 µm occur which cannot be planarized according to the prior art method.

Further, European Patent 0,178,500 (which corresponds to U.S. Pat. No. 4,568,601) discloses a method in which a photostructurable polymer is applied over the entire semiconductor wafer and is cross-linked only locally at the structures to be planarized. Non-cross-linked polyimide is then developed away so that it projects only at the structures to be planarized and can then be planarized at reduced expense, for example by overcoating with subsequent plasma etching. However, it is a drawback that, in this method for the directed cross-linking of the polymer at the structures to be planarized, the illumination must occur through a precisely fitting photomask. Moreover, because of the non-planar substrate surface, the method is not suitable for the planarization of large-area substrates since the polymer overcoating must be extremely uniform to ensure success of the isotropically attacking plasma etching step. Particularly in the case of very deep structures to be planarized, for example V-shaped optical fiber guide structures of a depth of about 100 µm, this method cannot be employed due to the considerable polymerization shrinkage of the applied materials.

SUMMARY OF THE INVENTION

In contrast thereto, in the method of the invention according to which a pre-polymer is selectively filled into the trench-like structures, this pre-polymer is hardened and then expanded. This offers the advantage that a sufficiently planar planarization is possible in a simple manner even for relatively deep trench-like structures.

For this purpose, a pre-polymer is selectively filled into the trench-like structures on the semiconductor substrate, this pre-polymer is hardened and then expanded.

Further features of the invention will become evident from the measures defined in the dependent claims.

In a simple manner, a preferably non-cross-linked or partially cross-linked pre-polymer, for example, a UV-hardenable epoxide adhesive is filled into the trench-like structures, with the filling, in a very advantageous embodiment of the invention, being effected by way of a dosaging reservoir provided separately on the semiconductor substrate and connected with the trench-like structures. For the long and narrow trench-like structures under discussion here, the capillary force of the polymer adhesive filled into the dosaging reservoir is sufficient to cause the adhesive to be uniformly distributed in the trench-like structures all the way to the frontal tip.

As a further feature of the invention, the polymer adhesive is preheated before being filled into the dosaging reservoir so that its viscosity better adapts itself to the given conditions with respect to wetting and surface tension.

As another advantageous feature of the invention, the polymer adhesive filled into the trench-like structures is polymerized, depending on the type of polymer material employed, by exposure to UV light or by heating and is thus hardened. Since polymerization inevitably results in a shrinkage process of the filled-in polymer adhesive, another feature of the invention provides that the residual depth resulting in the structures to be planarized is compensated or even overcompensated by chemical expansion of the polymer. In a very simple manner, this results in an (inelastic) change in the structure of the filled-in polymer which remains limited to the trench-like structures so that a permanent increase in volume is realized which continues to exist throughout the later processing, for example, during excimer laser ablation.

As a further advantageous feature of the invention, if the lack of residual depth is overcompensated, the now projecting expanded polymer is planarized by polishing, for example with a bound diamond grain so that a flush planarization result appears at the surface of the semiconductor substrate with a residual roughness that depends on the polishing agent employed. If, for special applications, an even smoother substrate surface is required, a centrifugal or immersion coating of the entire area may be employed to produce a fine planarization in a known manner, for example, by means of a pre-cross-linked polyimide.

For the planarization of the trench-like structures as part of a process chain, in which it is incorporated, the present invention employs exclusively organic polymer materials in order to be able to easily open them again later on by excimer laser ablation in the manner already discussed above. This results in a significant simplification of the process for structuring the fiber guide structures which are produced together with integrated optical light waveguides on a common chip. It also opens up opportunities for the simplified manufacture of three-dimensional microstructures by combining semiconductor etching steps, planarization by means of organic polymer materials, photolithography processes and laser structuring as required for galvanic duplication of the microstructures and subsequent plastic molding.

Moreover, the method according to the invention is suited for the simple planarization of various structures on semiconductor or other substrates if attention is paid in the subsequent process sequences to the decomposition temperatures and the chemical stabilities of the polymer materials employed for the planarization. In this connection, the chemical stability against subsequent coatings can be noticeably increased by thin intermediate metal layers. These metal layers, which have thicknesses of <<1 μm, only insignificantly interfere with possibly required laser ablation processes.

BRIEF DESCRIPTION OF THE DRAWINGS

The invention will now be described in greater detail for one embodiment thereof with reference to the associated drawing figures.

DETAILED DESCRIPTION OF THE PREFERRED EMBODIMENT

Figure 1:
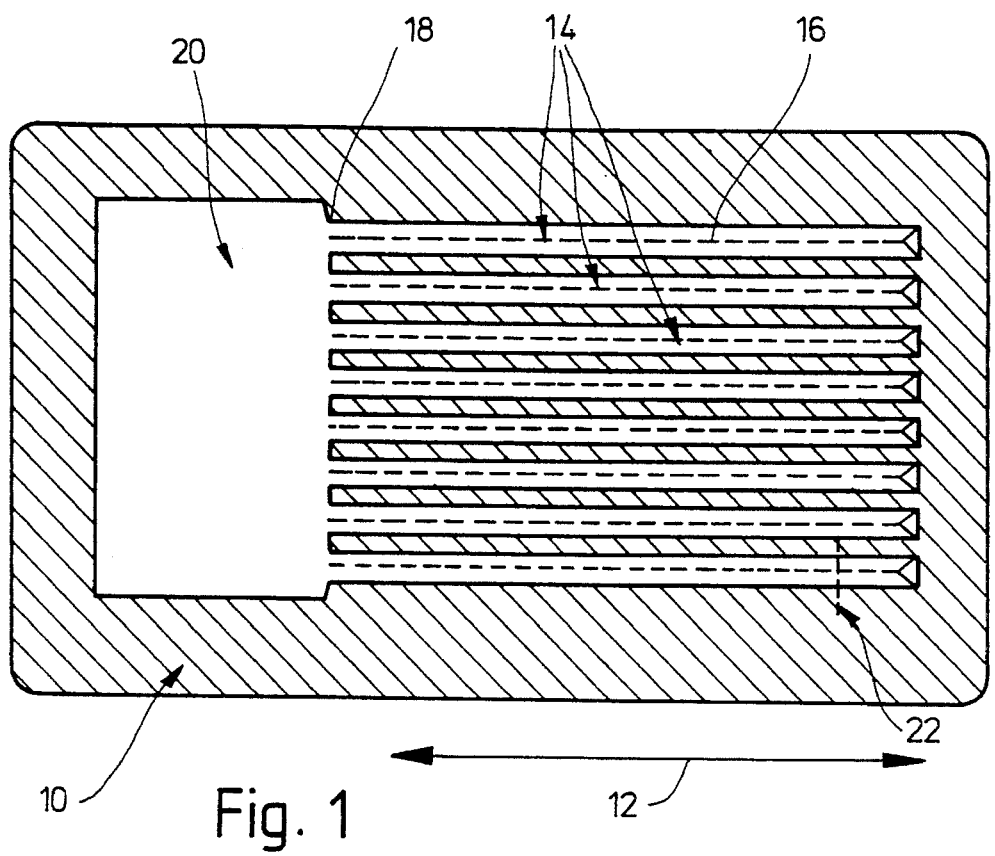
FIG. 1 is a top view of fiber guide structures in a substrate wafer for a polymer component.

FIG. 1 is a top view of a semiconductor substrate 10. In a region 12, the semiconductor substrate 10 is provided with trench-like structures 14 that are to be planarized. In the illustrated embodiment, these trench structures 14 are anisotropically etched-in V-shaped fiber guide structures for the later accurate positioning of optical fibers to be inserted. The V-shaped configuration of the trench-like structures 14 is indicated by a dashed line 16 which thus constitutes the lowest point of the trench-like structures 14. At their one end 18, the trench-like structures 14 open into a so-called dosaging reservoir 20 in the form of a trough. Dosaging reservoir 20 and trench-like structures 14 wave jointly etched in after the application of a suitable mask layout, with the known etching step not needing to be discussed in detail here.

Dosaging reservoir 20 is here disposed in a region of semiconductor substrate 10 that lies outside of the region 12 required for the components on semiconductor substrate 10. By means of a suitable device, for example a fine pipette, a micronozzle or an automatic dosaging device, a non-cross-linked or partially cross-linked pre-polymer, for example a UV hardenable epoxide adhesive, is now filled into dosaging reservoir 20. By filling in a corresponding, predeterminable required quantity of the polymer adhesive, the latter is distributed by the developing capillary forces to the end of region 12 in the trench-like structures. With a suitable selection of the material of the epoxide adhesive with respect to wetting capability, surface tension and viscosity, the uniform distribution of the polymer adhesive in the trench-like structures 14 can be optimized. The viscosity of the polymer adhesive can be adapted to the existing conditions particularly by suitably pre-heating the adhesive to a working temperature.

Surface tensions that develop in the polymer adhesive will generally produce a residual depth that extends from the edges of the trench-like structures 14 in the direction toward line 16 and deviates from a planar surface.

Figure 2:
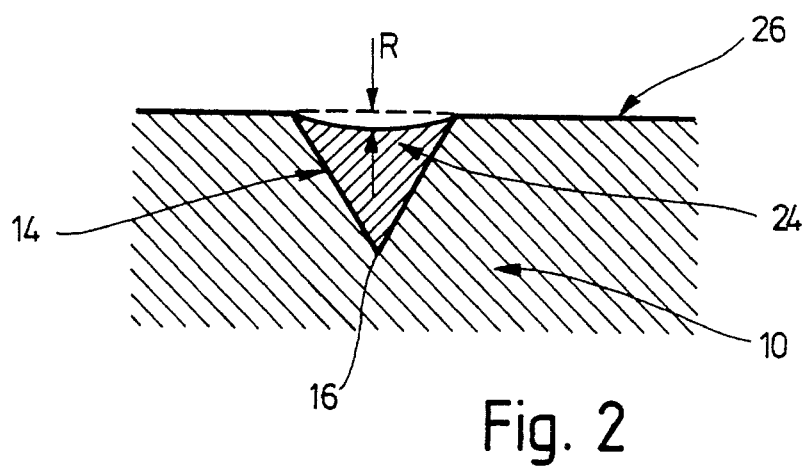
FIG. 2 is a cross-sectional view of a trench-like structure of FIG. 1.

FIG. 2 is a cross-sectional view of a trench-like structure 14 at the location marked 22 in FIG. 1. The V-shaped groove of trench-like structure 14 that is etched into semiconductor substrate 10 is clearly visible. The polymer adhesive 24 filled in by way of dosaging reservoir 20 is disposed in trench-like structure 14. Due to the already mentioned surface tension, the polymer adhesive develops a concave surface extending from the surface 26 of semiconductor substrate 10 in the direction toward the lowest point 16 of the trench-like structure 14 so that a residual depth R develops. In a further working step, the polymer adhesive 24 filled into the trench-like structures 14 is hardened, that is, polymerized. Depending on the material of the polymer adhesive 24, the latter is subjected to full-area UV illumination or it is heated to a certain polymerization temperature. Due to the polymerization process, polymer adhesive 24 inevitably undergoes a shrinkage process as a result of which residual depth R continues to increase and, in the filled trench-like structures 14, the hardened polymer adhesive 24 is a few μm short of reaching surface 26 so that a desired planar surface 26, which is necessary for further treatment of the entire semiconductor substrate 10, does not yet exist.

Figure 3:
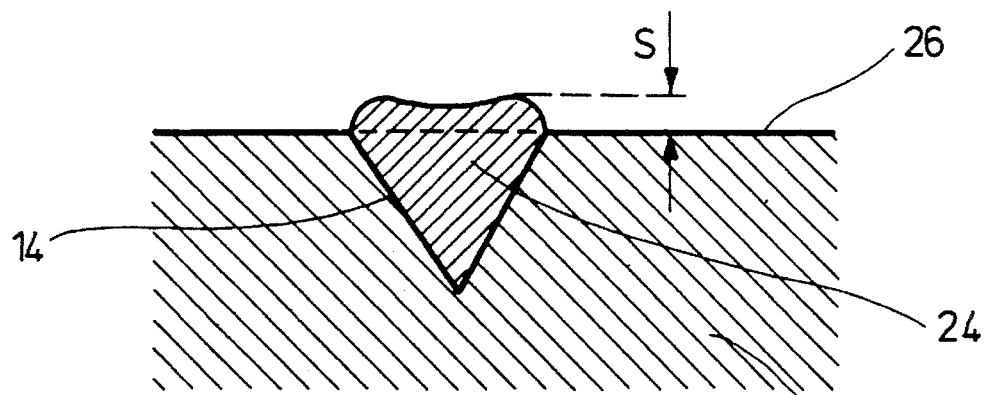
FIG. 3 is a cross-sectional view after a further process step.

As shown in FIG. 3, in a next process step, the polymer adhesive 24 that has shrunk and hardened in the trench-like structures 14 is chemically expanded. In this way, the residual depth R is at least compensated or, as illustrated, overcompensated so that an excess S results in the region of the trench-like structures 14. The expansion of polymer adhesive 24 produces an increase in volume in any case so that the trench-like structures 14 are reliably filled with the polymer adhesive 24 all the way to surface 26.

Depending on the material selected for polymer adhesive 24, it can be chemically expanded in different ways. For example, it is conceivable to diffuse in non-cross-linked pre-polymer, for example MMA in an acrylate or epoxide adhesive, which is subsequently cross-linked by exposure to UV light. Also possible is a change in the structure of the polymer adhesive 24 which results in a permanent increase in volume and can be realized by the attack of inorganic substances, for example acids or bases, in the opening region of the trench-like structures 14. Also possible is the chemical expansion of polymer adhesive 24 by diffusing in organic solvents which are able to effect a permanent increase in volume by changing the polymer structure of polymer adhesive 24. For example, an inelastic change in the structure of polymer adhesive 24 can be realized by the influence of low-boiling point organic solvents under pressure in an autoclave. As a whole, this accomplishes that the polymer adhesive 24 is positively expanded to project beyond the surface 26 of semiconductor substrate 10.

Figure 4:
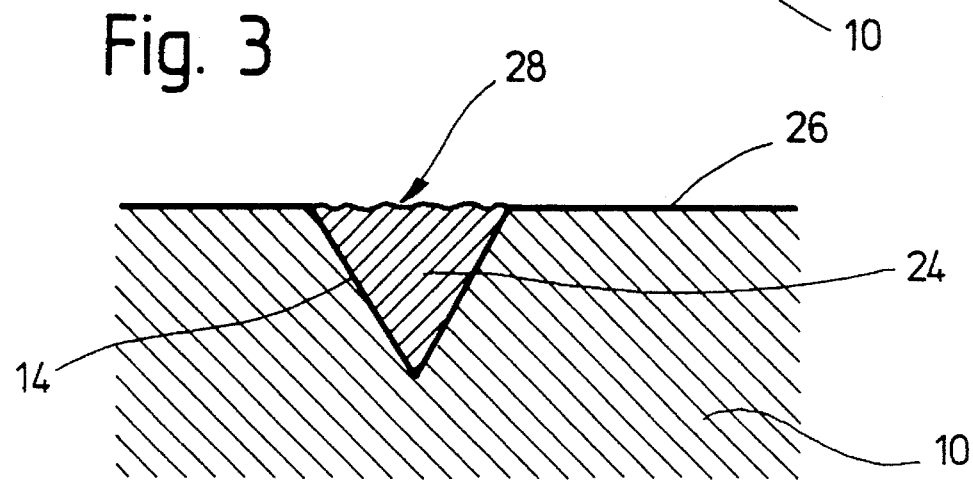
FIG. 4 is a cross-sectional view after a further process step.
Figure 5:
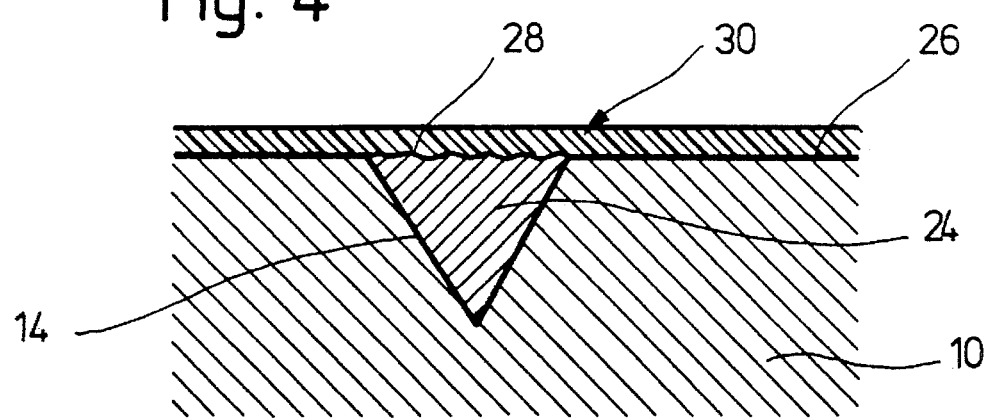
FIG. 5 is a cross-sectional view after a further process step.

In another method step shown in FIG. 4, the projection S resulting from the chemical expansion of polymer adhesive 24 is removed in a simple polishing step. The polishing may here by effected, for example, with a bound diamond grain. As a whole, this makes polymer adhesive 24 planar in the region of trench-like structures 14 so that a residual roughness 28 remains. Due to the different properties of semiconductor substrate 10 and polymer adhesive 24, the polishing step requires a high anisotropy, that is, removal rates that are a function of direction. If during the polishing step, the semiconductor substrate 10 is flexibly pressed on from its rear face, the planarization result attained in the form of a structure that is flush with the wafer surface is independent of the unavoidable fluctuations in thickness of semiconductor substrate 10. The residual roughness 28 then lies in the submicron range, depending on the polishing agent employed, and is thus negligibly small for normal applications.

If a simple polishing step should not be possible or desirable in the manufacturing process, the residual depth R can also be eliminated by a one or multi-step process composed of plasma etching and polyimide coating.

If, for certain applications, it is necessary to have a substrate surface 26 that is free of any residual roughness 28, a so-called fine planarization by centrifugal or immersion coating may be effected over the entire surface. For this purpose, a pre-cross-linked polyimide, for example, is applied as a layer 30 (See FIG. 4) to the surface 26 of semiconductor substrate 10 so that this whole-area layer 30 simultaneously compensates the residual roughness 28 and produces an absolutely planar substrate surface. If, depending on the polymer adhesive 24 employed, the latter is found not to be sufficiently resistant against the layer 30 of the pre-cross-linked polyimide, a thin metalization layer may be applied to surface 26 and particularly to the residual roughness 28 of polymer adhesive 24 before application of layer 30, so that, after application of layer 30, the latter no longer is in direct contact with polymer adhesive 24. The intermediate layer (not shown in the drawing figures) then has such a configuration that subsequent working of the planarized semiconductor substrate 10, particularly a subsequent excimer laser ablation, for the production of precisely defined abutments for the optical fibers to be inserted into the trench-like structures 14 is not negatively influenced thereby.

It will be understood that the above description of the present invention is susceptible to various modifications, changes and adaptations, and the same are intended to be comprehended within the meaning and range of equivalents of the appended claims.

What is claimed is:

1. In a method of planarizing trench structures in a substrate surface by filling in the trench structures, the steps of selectively filling a pre-polymer into the trench structures, hardening the pre-polymer, and then expanding the pre-polymer.

2. A method as defined in claim 1, wherein the substrate containing the trench structure is a semiconductor substrate.

3. A method as defined in claim 1, wherein non-cross-linked or partially cross-linked pro-polymer is filled in.

4. A method as defined in claim 1, wherein the prepolymer is hardened by exposure to UV light over the entire surface.

5. A method as defined in claim 1, wherein the propolymer is hardened by thermal treatment.

6. A method as defined in claim 1, wherein the hardened pro-polymer is chemically expanded so that it experiences a permanent change in structure.

7. A method as defined in claim 6, wherein the chemical expansion is effected by diffusing in non-cross-linked pre-polymer and by subsequent cross-linking.

8. A method as defined in claim 7, wherein the cross-linking is effected by UV illumination.

9. A method as defined in claim 6, wherein the chemical expansion is effected by the application of an inorganic substance.

10. A method as defined in claim 9, wherein the inorganic substance is an acid or a base.

11. A method as defined in claim 6, wherein the chemical expansion is effected by diffusing in an organic solvent.

12. A method as defined in claim 11, wherein the diffusion occurs under pressure.

13. A method as defined in claim 1, further comprising polishing the expanded pre-polymer.

14. A method as defined in claim 13, wherein the substrate is a semiconductor substrate, and the semiconductor substrate is flexibly pressed on during the polishing.

15. A method as defined in claim 2, wherein the entire semiconductor substrate surface together with the planarized trench structures is subjected to fine planarization.

16. A method as defined in claim 15, wherein the fine planarization is effected by centrifugal or immersion coating with a cross-linked polyimide.

17. A method as defined in claim 15, wherein the planarized trench structures are provided with a metalization layer before the fine planarization, thereby protecting the structures.

18. A method as defined in claim 15, wherein the fine planarization is effected by one or repeated steps of alternating polyimide coating and plasma etching.

19. A method as defined in claim 2, wherein the filling of the pre-polymer into the trench structures is effected with at least one dosaging reservoir that is additionally disposed on the semiconductor substrate and is connected with the trench structures.

20. A method as defined in claim 1, wherein the prepolymer employed for the filling in is pre-heated or has its viscosity characteristics, surface tension and wetting capability adapted by dilution or partial polymerization.

* * * * *